United States Patent [19]
Iwasaki

[11] Patent Number: 5,701,191
[45] Date of Patent: Dec. 23, 1997

[54] OPTICAL SCANNER

[75] Inventor: Takeo Iwasaki, Nagoya, Japan

[73] Assignee: Brother Kogyo Kabushiki Kaisha, Nagoya, Japan

[21] Appl. No.: 635,627

[22] Filed: Apr. 22, 1996

[30] Foreign Application Priority Data

Apr. 21, 1995 [JP] Japan ................................ 7-096795

[51] Int. Cl.$^6$ .................................................... G02B 26/08
[52] U.S. Cl. ........................ 359/205; 359/206; 359/216; 359/819; 359/820
[58] Field of Search .................... 359/196, 197, 359/205–208, 212–219, 811, 819–820, 822, 827, 830; 347/256–261; 250/234–236

[56] References Cited

U.S. PATENT DOCUMENTS

| | | |
|---|---|---|
| 3,999,010 | 12/1976 | Oosaka et al. . |
| 4,297,713 | 10/1981 | Ichikawa et al. . |
| 4,367,912 | 1/1983 | Kitamura . |
| 4,720,168 | 1/1988 | Kaneko . |
| 5,255,015 | 10/1993 | Noethen et al. ................... 359/820 |
| 5,255,115 | 10/1993 | Kikuchi ............................. 359/209 |

FOREIGN PATENT DOCUMENTS

| | | |
|---|---|---|
| 55-43577 | 3/1980 | Japan . |
| 55-129313 | 10/1980 | Japan . |
| B2-57-49889 | 10/1982 | Japan . |
| B2-58-32545 | 7/1983 | Japan . |
| 58-153907 | 9/1983 | Japan . |
| B2-61-11018 | 4/1986 | Japan . |
| 61-162014 | 7/1986 | Japan . |
| 61-212861 | 9/1986 | Japan . |

*Primary Examiner*—James Phan
*Attorney, Agent, or Firm*—Oliff & Berridge

[57] ABSTRACT

The housing 2 is integrally formed with a cylindrical support portion 6. A cylindrical bore 30*a* is formed through the support portion 6. An inner diameter of the bore 30*a* is made substantially equal to an outer diameter of the semiconductor laser 4. The semiconductor laser 4 is therefore supported in the bore 30*a*. A lens barrel 7 holds therein a collimator lens 5. The outer diameter of the lens barrel 7 is also substantially equal to the inner diameter of the bore 30*a*. The lens barrel 7 is also supported in the bore 30*a*.

20 Claims, 7 Drawing Sheets

FIG. 8 (a)
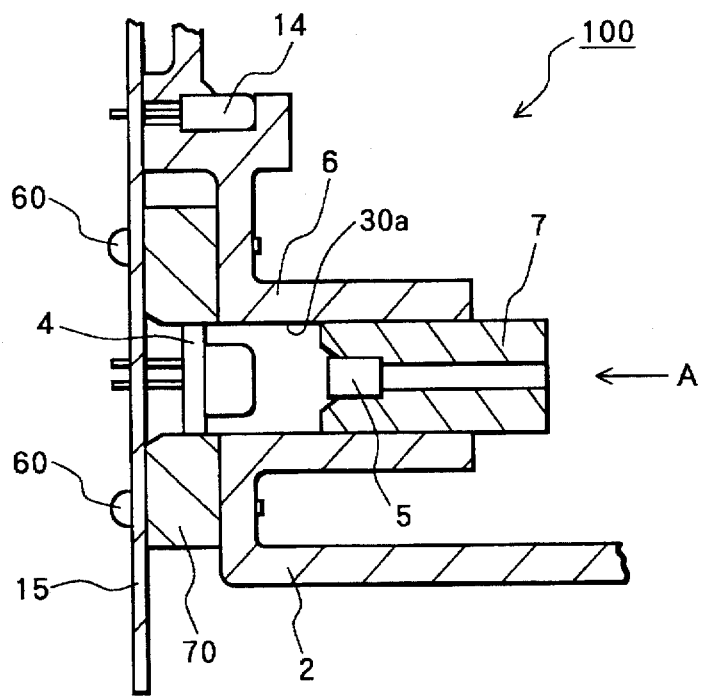
FIG. 8 (b)
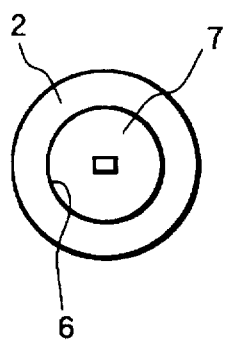
FIG. 9 (a)
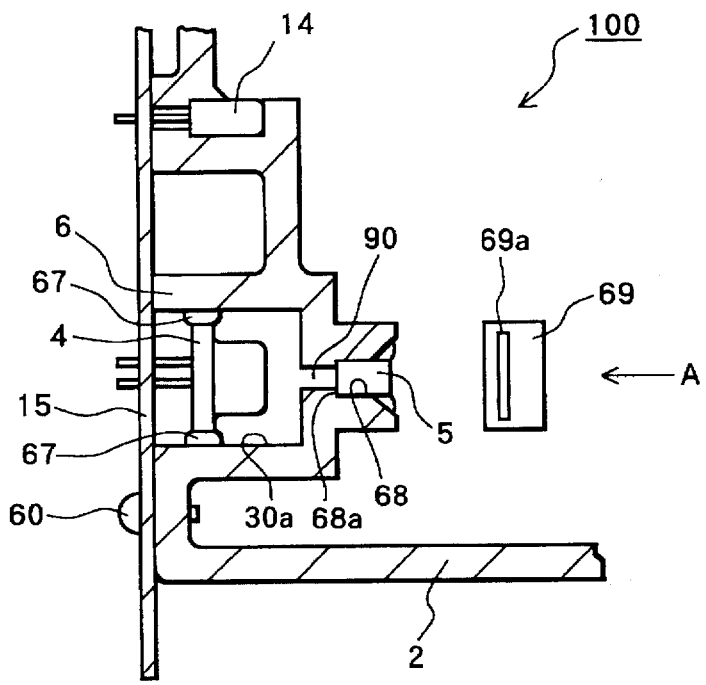
FIG. 9 (b)

OPTICAL SCANNER

BACKGROUND OF THE INVENTION

1. Field of the Invention

The present invention relates to an optical scanner for optically scanning a medium.

2. Description of the Related Art

In recent years, an electrophotographic type recording device has been used to record image data from computers. To expose the surface of a photosensitive drum to image data, this type of recording device includes an optical scanner for scanningly deflecting a laser beam over the surface of the photosensitive dry.

Japanese Patent Application (Kokai) SHO-61-162014, Japanese Patent Application (Kokai) SHO-55-43577, and Japanese Patent Application (Kokai) SHO-61-212861, have disclosed various types of optical scanners. Each of these optical scanners employs a laser unit for generating a laser beam. The laser beam is deflected to scan the photosensitive drum.

SUMMARY OF THE INVENTION

It is conceivable to provide an optical scanner as shown in FIGS. 1 and 2. FIG. 1 is a plan view of the conceivable optical scanner 41 for irradiating a photosensitive drum 3, which serves as a recording medium. The optical scanner 41 includes a housing 42 for housing all the components required to generate the laser beam and scan it over the photosensitive drum 3.

More specifically, the optical scanner 41 includes a laser unit 43, a cylindrical lens 47, a polygonal mirror 46, imaging lenses 48, and a beam detection unit 58. The laser unit 43 includes a semiconductor laser 44 and a collimator lens 49 provided in an integrated unit in a manner to be described later. The semiconductor laser 44 generates a laser beam in a horizontal direction. The generated laser beam passes through the collimator lens 49, where it is converged into a beam of parallel rays. After passing through the collimator lens 49, the laser beam falls incident on the cylindrical lens 47.

The cylindrical lens 47 converges the incident parallel beam on a reflecting surface of the polygonal mirror 46 only in a direction along a rotational axis of the polygonal mirror 46.

The polygonal mirror 46 has six reflecting surfaces. The polygonal mirror is produced through grinding an aluminum. The polygonal mirror 46 is mounted on a shaft of a motor (not shown in the drawing) via a high-precision bearing. The motor drives the polygonal mirror 46 to rotate at a fixed speed. The laser beam emerging from the collimator lens 49 as parallel rays strikes the reflecting surface of the rotating polygonal mirror 46. The rotation of the polygonal mirror 46 causes the parallel rays to deflect at a constant angular velocity in a substantially horizontal sweep.

Ball bearings are the most common type of bearing used for the motor that is rotating at a speed of 10,000 rpm or less. However, dynamic pressure bearings are preferable for rotating at speeds exceeding 10,000 rpm. Japanese Patent Publication (Kokoku) No. SHO-57-49889 describes a dynamic pressure bearing assembly provided with a magnetic bearing for support in the direction of thrust and a pneumatic bearing for support in the radial direction. This type of bearing does not suffer from loss of durability at high rotating speeds as do ball bearings.

Well-known motors such as hysteresis synchronous motors and DC servomotors can be employed to drive the polygonal mirror 46. Those motors have a magnetic circuit, and produce torque using magnetic driving forces generated in the magnetic circuit. The magnetic circuit therefore includes a coil winding and an iron plate for generating the magnetic forces. Accordingly, the magnetic circuit requires a comparatively large housing space.

There are several problems concerning precision at which the polygonal mirror 46 is processed and attached to the motor. First, variation in angles between different reflective surfaces of the polygonal mirror 46 will generate shift of a resultant scanning beam in the direction in which it scans, that is, in the main scanning direction. Second, significant error in parallelism between different reflecting surfaces of the polygonal mirror 46 causes resultant scanning beams to be shifted in the direction perpendicular to the main scanning direction, that is, in the auxiliary scanning direction. This leads to scanning beams with uneven pitch.

The first problem can be solved by methods proposed in Japanese Patent Publication (Kokoku) No. SHO-58-32545 and Japanese Patent Publication (Kokoku) No. SHO-61-11018. In this method, a reference frequency, for example, an N-fold value of a clock frequency used for recording data, is selected in advance. A detection signal outputted from a beam detector, which will be described later, starts count of the clock frequency. This method allows holding down to 1/N the counting start error, that is, the degree to which the scanning line is shifted in the main scanning direction.

The second problem can be optically corrected through converging the laser beam onto the polygon mirror 46 only in the direction along the rotational axial of the polygon mirror 46. The laser beam is irradiated on the mirror surfaces as a narrow line image that extends perpendicular to the rotational axis of the polygon mirror 46. With this mechanism, the scanning position will not be affected by variation in slant of the mirror surfaces.

The imaging lenses 48 have an fθ characteristic, and converge the laser beam, reflected from the polygonal mirror 46, into a spot on the surface of the photosensitive drum 3.

The laser beam which sweeps according to rotation of the polygonal mirror 46 is guided to the beam detection unit 58 provided in an area outside of the image region. The beam detection unit 58 includes a single reflecting mirror 55, a slit plate 56 having a narrow slit, and a photoelectric conversion element board 57 with a high response speed. The photoelectric conversion element board 57 outputs a detection signal when it detects the sweeping laser beam. The detection signal is for controlling timing at which a signal is inputted to the semiconductor laser 44 to start irradiation of the surface of the photosensitive drum 3 with desired image data. Because photoelectric conversion element can malfunction due to surrounding electrical noises, the photoelectric conversion element board 57 is electrically shielded to prevent malfunctioning.

It is noted that in order to produce the slit plate 56, a thin metal plate is punched so that a rectangular slit is formed through the metal. The slit plate 56 is positioned precisely at a position that the slit can guide the laser beam from the mirror 55 toward the electric conversion element 57.

The laser 44 is modulated at timings controlled by the detection signals from the photoelectric conversion element board 57. The laser beam emitted from the laser 44 passes through the above-described optical elements installed within the housing 42 to finally irradiate the surface of the photosensitive drum 3. After an image is formed or developed on the drum by means of well-known electrophotographic processes, the image is transferred and fixed onto a transfer material such as a plain paper or the like and discharged as a hard copy.

Next, the laser unit 43 incorporated in the above-described optical scanner 41 will be described in greater detail while referring to FIG. 2.

FIG. 2 is a cross-sectional view showing configuration of the laser unit 43. The laser unit 43 is detachably provided to the housing 42 of the optical scanner 41 and has the following basic configuration.

As shown in FIG. 2, the laser unit 43 includes a laser holder 45, a lens barrel 50, and a lens barrel holder 52. The laser holder 45 supports the semiconductor laser 44. The lens barrel 50 supports the collimator lens 49 and the slit plate 51. The slit plate 51 is for regulating the shape of the laser beam emitted from the lens 49. The lens barrel holder 52 supports the lens barrel 50. An upstream side end face 52a of the lens barrel holder 52 abuts against a downstream side end face 45a of the laser holder 45 and is fixed to it by screws 59. To ensure alignment of the optical axes of the semiconductor laser 44 and the collimator lens 49, the downstream side end face 45a is formed flat to extend normal to the optical axis of the semiconductor laser 44.

The laser holder 45 tightly holds the semiconductor laser 44. In order to provide such tight contact, the semiconductor laser 44 is force-fitted or forcibly inserted into a cylindrical bore formed through the laser holder 45. Or, the semiconductor laser 44 may be pressingly contacted to the bore with a leaf spring. The semiconductor laser 44 may be fixed to the bore by filling the space, between the semiconductor laser and the inner surface of the bore, with an adhesive having a comparatively high thermal conductivity.

The collimator lens 49 is supported in the interior of the cylindrical lens barrel 50 at its upstream end. The collimator lens 49 may be bonded to the lens barrel 50. Or, the lens may be fixed to the lens barrel with a ring screw.

The lens barrel 50 is inserted into a cylindrical bore provided in the lens barrel holder 52. The lens barrel 50 is running fitted in the barrel holder 52. The lens barrel 50 is slidable in the optical axis direction so that the collimator lens 49 is located at a position distant from the semiconductor laser 44 with the focal length of the lens 49. After precisely positioning the collimator lens 49, the lens barrel 50 is fixedly secured to the lens barrel holder 52 with an adhesive or a screw. As the adhesive, instant-binding adhesive is used. A high viscosity adhesive such as an epoxy-type adhesive may also be used.

The slit plate 51 is attached with an adhesive to the downstream side end of the lens barrel 50. The slit plate 51 has a slit or an aperture 54 for shaping the parallel laser beam emerging from the collimator lens 49 into a beam shape that will properly converge into a spot on the photosensitive drum 3.

To assemble the laser unit 43, the above-described components of the laser unit 43 are first positioned precisely relative to one another and are fitted together. Thus, a highly precise assembly of the laser unit 43 is obtained. Then, the thus assembled laser unit 43 is installed in the housing 42. The optical axes are aligned among the laser unit 43, the cylindrical lens 47, the polygonal mirror 46, the image-forming lenses 48, and other components. Assembly of the optical scanner 41 is then complete.

The above-described optical scanner 41, however, has various problems.

First, the laser unit 43 has a large number of parts including the semiconductor laser 44, the laser holder 45, the collimator lens 49, the lens barrel 50, the slit plate 51, and the lens barrel holder 52. This requires significant labor for assembly.

When assembling the laser unit 43, the components of the laser unit are precisely positioned relative to one another before being fitted together. Then, when the thus assembled laser unit 43 is installed in the housing 42, the optical axes alignment and other adjustment operations are performed between the laser unit 43 and other components. Complete assembly of the optical scanner 41 therefore requires many manufacturing steps and involves significant labor by manufacturing personnel, thus preventing improvements in production efficiency.

In more concrete terms, in order to produce the optical scanner 41, the following processes are necessarily attained. The laser holder 45 and the lens barrel holder 52 have to be produced through separate processes because they have inner bores having different diameters. The laser holder 45 and the lens barrel holder 52 are then aligned and secured with each other. When assembling the laser unit 43, the components of the laser unit have to be positioned precisely relative to one another. The positions of the components therefore have to be detected and finely adjusted. When the thus produced laser unit 43 is mounted in the housing 42, the position of the laser unit 43 has to be detected and finely adjusted relative to other optical elements mounted in the housing 42. Thus, the positional adjustments are attained twice during the production process of the optical scanner 41.

It is therefore an objective of the present invention to solve the above-described various problems and provide an improved optical scanner with a simple configuration having fewer components and a simplified assembly requiring fewer manufacturing processes.

In order to obtain the above objective and other objective, the present invention provides an optical scanning device for optically scanning a medium, the optical scanning device comprising: a light source for emitting a light beam; optical axis determination means for determining an optical axis, along which the light beam emitted from the light source travels; deflection means for deflecting the light beam which has travelled along the optical axis; optical imaging means for receiving the deflected light beam and for imaging the light beam into a beam spot on a medium to be scanned; a housing for housing the deflection means and the optical imaging means; and a support portion for supporting at least one of the light source and the optical axis determination means, the support portion being integrally formed with the housing.

According to another aspect, the present invention provides an optical scanning device for optically scanning a medium, the optical scanning device comprising: a light source for emitting a light beam; optical axis determination means for determining an optical axis, along which the light beam emitted from the light source travels; deflection means for deflecting the light beam which has travelled along the optical axis; optical imaging means for receiving the deflected light beam and for imaging the light beam into a beam spot on a medium to be scanned; a housing for housing the deflection means and the optical imaging means; and a support portion for supporting at least one of the light source and the optical axis determination means, the support portion being integrally formed with the housing, the support portion having a linear expansion coefficient L, the linear expansion coefficient L [1/°C.] satisfying the following inequality:

$$-0.0004 < C - D \times (E \times L - A \times B) < 0.0004$$

where A [m/nm] is an axial chromatic aberration of the optical axis determination means; B [nm/°C.] is a temperature coefficient of a wavelength of the light beam; C [m/°C.] is a temperature coefficient of a back focus of the optical imaging means; D is a total axial magnification in the deflecting direction obtained by the optical axis determination means, the deflection means, and the optical imaging means; and E [m] is a distance along the optical axis direction between a light emission point of the light source and a reference plane on which the optical axis determination means is mounted.

BRIEF DESCRIPTION OF THE DRAWINGS

The above and other objects, features and advantages of the invention will become more apparent from reading the following description of the preferred embodiment taken in connection with the accompanying drawings in which:

FIG. 8(a) is an enlarged plan view of a laser-driving area 100 in an optical scanner of still another modification of the present invention which partially shows a cross-section;

FIG. 8(b) is a side view of a lens barrel 7 as viewed from A in FIG. 8(a);

FIG. 9(a) is an enlarged plan view of a laser-driving area 100 in an optical scanner of another modification of the present invention which partially shows a cross-section; and FIG. 9(b) is a side view of a slit holder 69 as viewed from A in FIG. 9(a).

DETAILED DESCRIPTION OF THE PREFERRED EMBODIMENT

Figure 1:
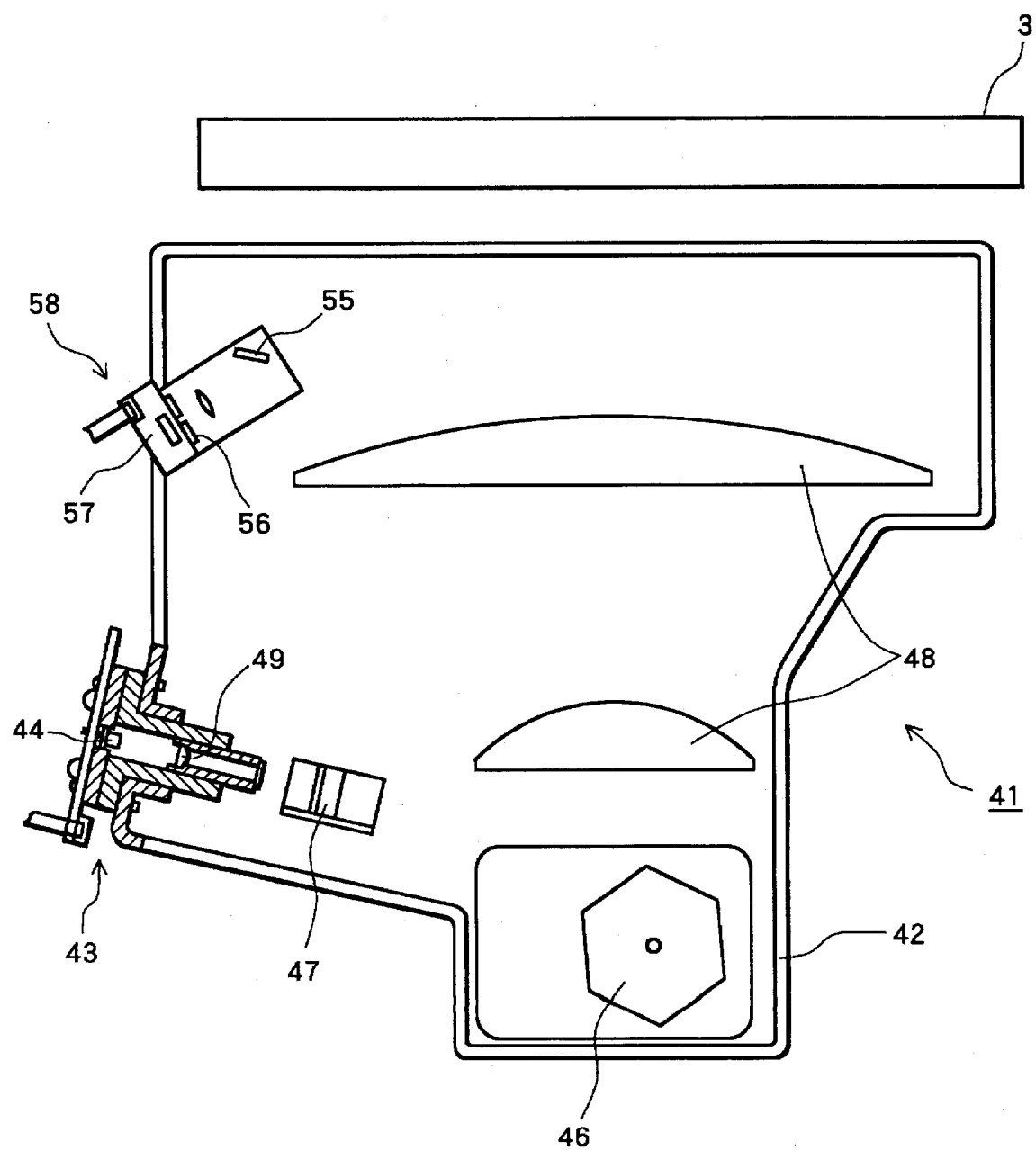
FIG. 1 is a plan view of a conceivable optical scanner.
Figure 2:
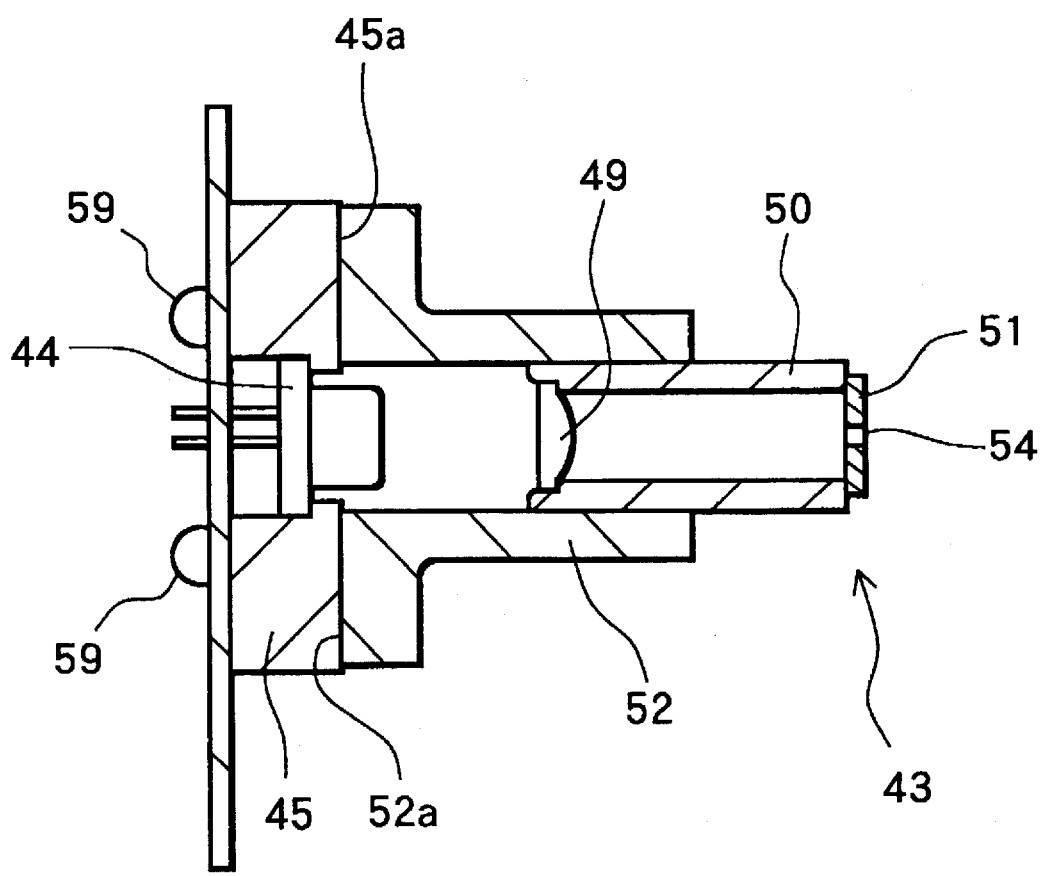
FIG. 2 is an enlarged plan view of a laser unit 43 of the optical scanner of FIG. 1 which partially shows a cross-section of the laser unit 43.

An optical scanner according to a preferred embodiment of the present invention will be described while referring to the accompanying drawings wherein like parts and components are designated by the same reference numerals to avoid duplicating description.

Figure 3:
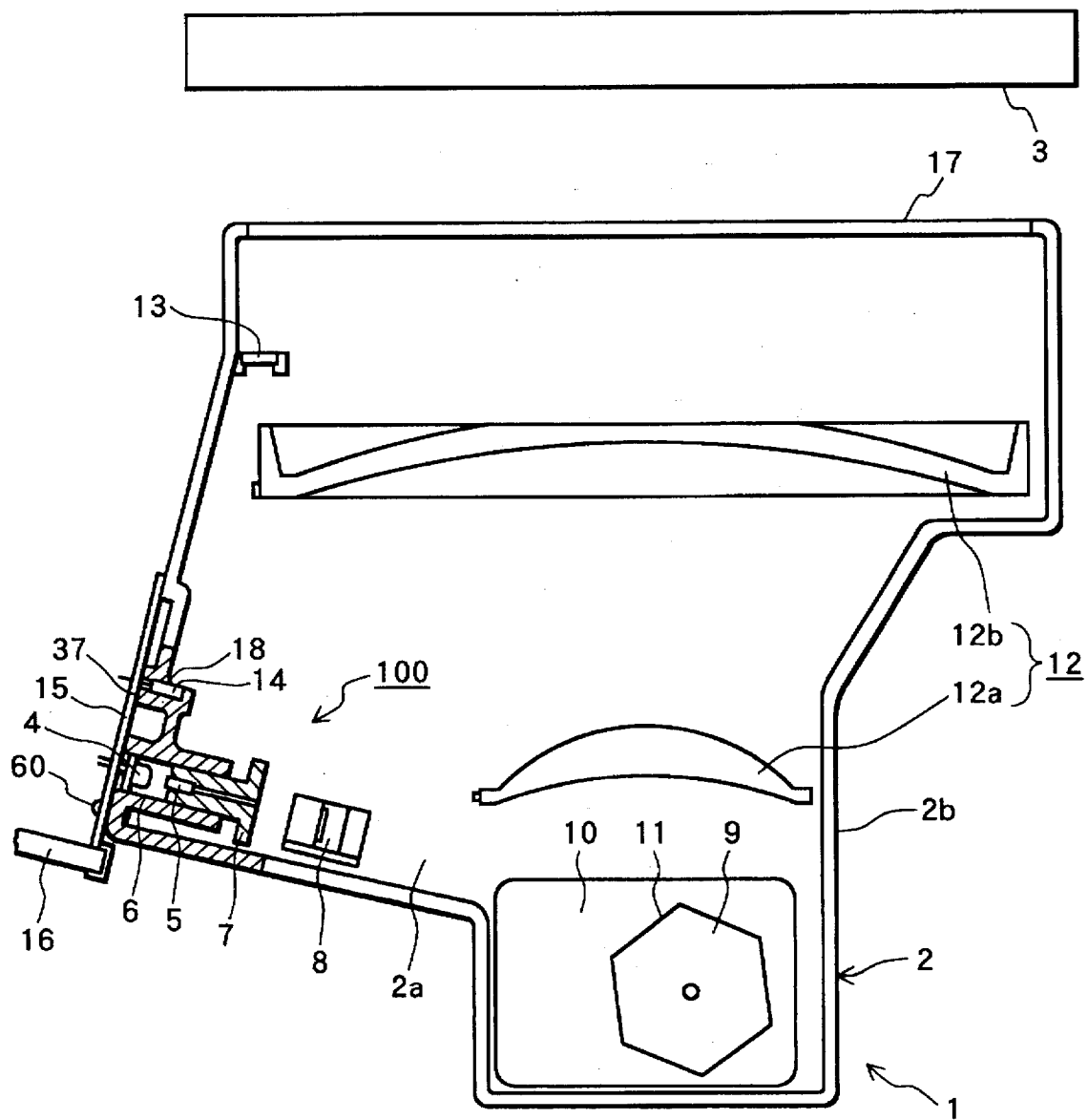
FIG. 3 is a plan view of an optical scanner according to an embodiment of the present invention.

FIG. 3 is a plan view showing an optical scanner 1 according to the embodiment of the present invention. The optical scanner 1 is for optically scanning a photosensitive drum 3, which serves as a medium to be recorded on.

The optical scanner 1 mainly includes: a laser driving area 100, a cylindrical lens 8, a polygonal mirror 9, an imaging lens set 12, and a mirror 13. These components are entirely installed in a housing 2 of the optical scanner 1.

The housing 2 is formed into an integral body from resin. In this example, the housing 2 is formed from a fiberglass-containing polycarbonate. This resin is widely used in the technical field and therefore is cheap. This resin can support all the components with high precision. Also, this resin is hardly distorted due to vibration occurred when the mirror 9 is rotating.

The housing 2 has a bottom wall 2a and a side wall 2b integrally formed with each other. The bottom wall 2a extends horizontally, and the side wall 2b extends vertically. The side wall 2b is opened at a position confronting the photosensitive medium 3. A window 17 is attached to the opening. A laser beam is outputted through the window 17 from the optical scanner 1 and scans the photosensitive medium 3.

The laser driving area 100 includes a laser-lens support 6 for supporting both a semiconductor laser 4 and a collimator lens 5, and also includes a sensor support 37 for supporting a beam detection sensor 14. Both of these supports 6 and 37 are formed integrally with the side wall 2b from the above-described resin.

As shown in FIG. 4(a), the laser-lens support 6 is of a cylindrical shape with its central axis X extending horizontally. In other words, the laser-lens support 6 has a cylindrical outer surface 30b. A cylindrical inner bore 30a is formed through the laser-lens support 6. The semiconductor laser 4, which is substantially of a cylindrical shape, is supported in the bore 30a. In more concrete terms, the inner diameter of the bore 30a (i.e., the inner diameter of the cylindrical support 6) is made substantially equal to an outer diameter of the semiconductor laser 4. The semiconductor laser 4 is therefore directly supported in the bore 30a.

A collimator lens 5 is held in a substantially cylindrically-shaped lens barrel 7. The outer diameter of the lens barrel 7 is made substantially equal to the inner diameter of the bore 30a (i.e., the inner diameter of the support 6.) The lens barrel 7 is supported in the bore 30a so that the collimator lens 5 confronts the semiconductor laser 4. Accordingly, a laser beam emitted from the semiconductor laser 4 falls incident on the collimator lens 5.

The position of the lens barrel 7 is adjusted along the central axis of the bore 30a so that a distance between the collimator lens 5 and the semiconductor laser 4 is precisely adjusted to be equal to the focal length of the collimator lens 4. With this arrangement, the laser beam emitted from the semiconductor laser 4 is converted by the collimator lens 5 into a beam of parallel rays.

The lens barrel 7 is formed with an inner bore 26 shown in FIG. 4(a) for guiding the parallel beam emitted from the collimator lens 5 and for outputting the parallel beam from the lens barrel 7.

Because the support 6 is thus used for supporting both the laser 4 and the lens 5, the number of parts can be reduced. Because the support 6 has a simple cylindrical structure, when the housing 2 is produced, a simple cylindrical mold can be used for producing the support 6 integrally with the housing 2. Thus, the support 6 can be easily produced.

As shown in FIG. 3, the cylindrical lens 8 is mounted on the bottom 2a of the housing 2 at a position confronting the lens barrel 7. The cylindrical lens 8 is for receiving the parallel beam outputted from the lens barrel 7 and for converging the laser beam only in a direction along a rotational axis of the polygon mirror 9. That is, the cylindrical lens 8 forms, on mirror surfaces 11 of the polygon mirror 9, a line image extending perpendicular to the polygon mirror rotational axis. The cylindrical lens 8 therefore serves to correct errors in the parallelism between the respective reflecting surfaces 11 of the polygonal mirror 9.

The polygonal mirror 9 is rotatably attached to a rotational shaft of a motor (not shown in the drawing) so that the rotational axis of the polygonal mirror is in alignment with the rotational shaft of the motor. The motor is mounted on a motor driving board 10. The driving board 10 is fixedly secured to the housing bottom 2a through well-known methods such as driving screws. As the motor rotatingly drives the polygonal mirror 9, the polygonal mirror 9 successively deflects the incident laser beam radially in a horizontal direction along the housing bottom 2a.

The Fθ lens set 12 is also mounted on the housing bottom 2a so as to receive the laser beam deflected from the polygonal mirror 9. The Fθ lens set 12 has an Fθ characteristic so that the deflected laser beam converges into a spot onto the surface of the photosensitive drum 3 and so that the spot moves or scans at a constant speed on the photosensitive drum 3. The Fθ lens set 12 therefore serves as an optical imaging system for receiving the deflected laser beam and imaging the laser beam into a beam spot on the photosensitive drum 3.

The laser beam having passed through the Fθ lens set 12 is then emitted out of the housing 2 through the window 17. The laser beam then irradiates the surface of the photosensitive drum 3. After an image is formed or developed on the photosensitive drum 3 by means of well-known electrophotographic processes, the image is transferred and fixed to a transfer material such as a plain paper or a special paper and outputted as a hard copy.

A return mirror 13 is mounted on the housing bottom 2a. The mirror 13 is located at a rear side of one edge of the Fθ lens set 12 so as not to disturb the irradiation of the photosensitive medium 3 with the deflected beam. When the deflected laser beam passes through the edge of the Fθ lens set 12, the laser beam reaches the mirror 13 and reflects off the mirror 13. The laser beam then travels back to the laser-driving area 100.

In the laser-driving area 100, the laser beam is guided by a knife-edge portion 18 before falling incident on the beam detector 14. The beam detector 14 is constructed from a photoelectric conversion element. The beam detector 14 is for detecting the incident laser beam, and outputs a detection signal. The detection signal is used for controlling the start timing at which the semiconductor laser 4 is supplied with image data.

The laser-lens support 6 will be described below in greater detail with reference to FIGS. 4(a) and 4(b).

The laser-lens support 6 has opposite ends, i.e., an upstream side end 6a exposed outside of the housing 2 and a downstream side end 6b confronting inside of the housing 2.

The inner diameter of the bore 30a (the inner diameter of the support 6) is substantially equal to the outer diameter of the semiconductor laser 4. Preferably, the inner diameter of the bore 30a is slightly smaller than the outer diameter of the semiconductor laser 4. The semiconductor laser 4 is therefore force-fitted or forcibly inserted into the bore 30a from the upstream side end 6a of the support 6. An interference fit is therefore established between the outer peripheral surface of the semiconductor laser 4 and the inner peripheral surface of the bore 30a. Because the inner peripheral surface of the bore 30a is thus in intimate contact with the outer surface of the semiconductor laser 4, the support wall 6 can highly efficiently release heat generated from the laser 4. Generally, the semiconductor laser 4 generates heat while being driven with electric currents. This heat will possibly bring the semiconductor laser 4 out of order. For example, the wavelength of the laser beam will be varied. According to the intimate contact between the laser 4 and the inner side surface of the support 6, however, heat can be efficiently released through the peripheral side wall of the support 6.

It is noted that a tapered edge 20 is formed on the upstream side end 6a of the support 6 to facilitate insertion of the semiconductor laser 4 into the bore 30a.

The semiconductor laser 4 has an emission point 4a at its top surface, and has terminals 4b at its bottom. When the semiconductor laser 4 is inserted into the bore 30a from the upstream side end 6a, the emission point 4a is located inside the bore 30a while the terminal 4b being exposed outside from the upstream side end 6a.

On the cylindrically-shaped semiconductor laser 4, the beam emission point 4a is located substantially at its central position. Accordingly, when the laser 4 is force-fitted into the cylindrical bore 30a, the beam emission point 4a is located substantially on the central axis X of the cylindrical bore 30a.

The terminals 4b of the semiconductor laser 4 are connected via a soldering to a printed circuit board 15. The printed circuit board 15 has printed therein a driving circuit for driving the semiconductor laser 4. The printed circuit board 15 is connected to an external controller (not shown) via a harness 16 (shown in FIG. 3). The driving circuit on the board 15 receives image data from the external controller and drives the semiconductor laser 4 to emit a laser beam with its intensity modulated according to the image data. The printed circuit board 15 is fixedly secured to the side wall 2b via a screw 60. With this structure, the semiconductor laser 4 will not be displaced from its position even when the board 15 or the harness 16 is applied with external force. The semiconductor laser 4 will not be dropped off from the housing 2.

The semiconductor laser 4 is thus employed as a light source for emitting a light beam. It is noted that other various types of light sources can be used in stead of the semiconductor laser 4. For example, an ordinary LED, a waveguide-type LED, and the like can be used.

The lens barrel 7 will be described in greater detail below.

The lens barrel 7 is a resin molded product. As shown in FIG. 4(a), the lens barrel 7 has a cylindrical part 21 with its downstream side end 7b being formed with a flange (fringe) 22. The cylindrical part 21 is inserted into the bore 30a from the downstream side end 6b. Thus, the cylindrical part 21 and the semiconductor laser 4 are inserted into the bore 30a from opposite ends 6a and 6b. It is further noted that the outer diameter of the cylindrical part 21 is substantially equal to the inner diameter of the bore 30a and therefore that a central axis of the cylindrical part 21 is almost aligned on the central axis X of the cylindrical bore 30a.

An inner cylindrical bore 27 is formed in the cylindrical lens barrel 7. The bore 27 extends along the central axis of the lens barrel 7 from its upstream side end 7a that confronts the semiconductor laser 4. Another inner cylindrical bore 26 is formed in communication with the bore 27 and extends along the central axis of the lens barrel 7 toward a downstream side end 7b of the lens barrel 7. Both the cylindrical bores 26 and 27 are thus formed coaxially with the outer peripheral surface of the cylindrical part 21. The inner diameter of the bore 27 is slightly larger than the inner diameter of the bore 26 so that a stepped wall 27s is formed to connect the inner side surfaces of the bores 27 and 26.

A cylindrically-shaped collimator lens 5 is held in the bore 27 with its downstream side end being in abutment contact with the stepped wall 27s. The collimator lens 5 serves to determine an optical axis 24 along which the laser beam travels. In this example, the collimator lens 5 is a cylindrical glass lens. In more concrete terms, the cylindrical lens 5 is a gradient index (GRIN) lens which has a refraction index distributed on a plane normal to the central axis of the cylindrical lens.

A position of the collimator lens 5, relative to the emission point 4a of the semiconductor laser 4, determines an optical axis 24, along which the laser beam travels. That is, a laser beam travels along a line, on which the emission point 4a is located and along which the central axis of the collimator lens 5 substantially extends. This line is referred to as the optical axis 24.

According to the present invention, the collimator lens 5 is held in the bore 27 of the lens barrel 7, and therefore the central axis of the collimator lens 5 substantially coincides with the central axis of the cylindrical part 21. Because the central axis of the cylindrical part 21 substantially coincides with the central axis X of the bore 30a, the central axis of the lens 5 substantially coincides with the central axis X of the bore 30a.

Because the emission point 4a of the laser 4 is located substantially on the central axis X of the bore 30a, the optical axis 24 of the laser beam is established substantially along the central axis X of the cylindrical laser-lens support 6. Thus, the laser beam travels from the emission point 4a substantially along the central axis X of the bore 30a in a direction toward the downstream side end 6b.

It is noted that there is a possibility that the emission point 4a is slightly shifted from the center of the semiconductor laser 4 according to a production error in the semiconductor laser 4. Similarly, there is another possibility that the central axis of the bore 27 is slightly shifted from the central axis X of the bore 30a according to a production error in the lens barrel 7. Even in this case, because the emission point 4a emits the laser beam radially, the lens 5 can pick up a part of the laser beam that has travelled from the emission point 4a substantially along a straight line that connects the emission point 4a and the center of the lens 5. Thus, the laser beam enters the lens 5 at a certain incident angle. In this case, the optical axis 24, along which the laser beam travels, is slightly shifted from the central axis X of the bore 30a. However, because the laser 4 and the barrel 7 are both mounted in the same bore 30a, the shift amount of the optical axis 24 is restricted to a small value. Accordingly, the lens 5 can properly guide the laser beam to the lens 8.

The collimator lens 5 is inserted or force-fitted into the bore 27 from the upstream side end 7a. To facilitate insertion of the lens 5 into the bore 27, a tapered edge is formed on the upstream side end of the bore 27. The collimator lens 5 is positioned in the bore 27 with its downstream side end being in abutment contact with the stepped wall 27s. The stepped wall 27s thus serves as a reference plane determining the position of the collimator lens 5 along the optical axis 24. The collimator lens 5 is then fixed by an adhesive 28 to the inner side of the bore 27. A so-called UV adhesive is used as the adhesive 28 so that volatile components of the adhesive 28 will not adhere to the surface of the collimator lens 5. The UV adhesive hardens upon irradiated with ultraviolet rays.

It is noted that the outer diameter of the cylindrical part 21 is substantially equal to the inside diameter of the bore 30a (the inner diameter of the support 6.) Preferably, the outer diameter of the cylindrical part 21 is slightly smaller than the inner diameter of the bore 30a. Accordingly, when the cylindrical part 21 is inserted into the bore 30a, a running fit is established between the outer surface of the cylindrical part 21 and the inner surface of the bore 30a. Accordingly, the lens barrel 7 can be slidingly moved in the bore 30a to adjust the distance between the semiconductor laser 4 and the collimator lens 5. It is noted that a tapered edge is formed on the downstream side end 6b of the bore 30a to facilitate insertion of the lens barrel 7.

The position of the lens barrel 7 can be thus easily adjusted along the bore 30a so that a distance between the emission point 4a and the lens 5 is substantially equal to a focal length of the lens 5. The collimator lens 5 can therefore convert the laser beam from the semiconductor laser 4 into a beam of parallel rays. The parallel beam travels along the optical axis 24 through the bore 26 of the lens barrel 7 before emerging therefrom.

In the above description, the collimator lens 5 is located at a position to convert the original laser beam into a parallel beam. However, the lens 5 may be located at other positions so that the lens 5 converts the original beam into a divergent beam diverging in a conical shape or into a convergent beam converging in a reverse conical shape.

Similarly, other various kinds of lenses may be used as the collimator lens 5 for producing a desired beam, i.e., a parallel beam, a divergent beam, or a convergent beam. A desired beam shape can be obtained through adjusting various parameters such as the curvature of the lens 5, the thickness of the lens, distances between the lens 5 and the semiconductor laser 4 and the cylindrical lens 8, and the refraction index of the lens 5.

As shown in FIG. 4(b), a slit 23 is formed on the flange 22 in communication with the bore 26. A parallel laser beam having a predetermined cross-sectional shape emerges from the collimator lens 5 and travels through the bore 26. The slit portion 23 receives the parallel laser beam and converts the cross-sectional shape and size of the laser beam into those that are suitable for being converged into a spot of a proper shape and size on the photosensitive drum 3. In this example, the slit 23 has substantially a rectangular shape with curved corners as shown in FIG. 4(b). The size of the slit 23 determines the size of the beam spot formed on the photosensitive drum 3 as described below.

The imaging system, i.e., the Fθ lens set 12, receives the parallel beam emerged from the slit 23, and converges the parallel beam into a beam spot on the photosensitive drum 3. The size of the slit 23 therefore determines an incidence aperture A of the imaging system 12. In other words, the size of the slit 23 is equal to the size of the incidence aperture A of the imaging system 12. The minimum diameter of the spot "$d_{min}$" obtainable on the photosensitive drum 3 is determined as follows:

$$d_{min} = f\lambda/A$$

where f is the focal length of the imaging lens set 12, $\lambda$ is the wavelength of the laser beam, and A is the incidence aperture of the imaging system 12. If f and $\lambda$ are fixed, increasing A results in a smaller spot diameter $d_{min}$. Because the size of the slit 23 is equal to the size of the incidence aperture A of the imaging system 12, the slit 23 can control the beam spot diameter, and accordingly control the quality of an image to be formed on the photosensitive medium 3.

After the lens barrel 7 is slidingly moved in the bore 30a to be properly positioned relative to the semiconductor laser 4, the lens barrel 7 is fixedly secured to the bore 30a by an instant-binding adhesive 29. The instant-binding adhesive has a low viscosity and sets rapidly. This instant-binding adhesive is preferable because it can instantaneously fix the barrel 7 to the bore 30a after the barrel 7 is precisely positioned in the bore.

As shown in FIG. 4(b), the flange portion 22 has two almost flat vertical sides 25. The flat vertical sides 25 are connected with curved horizontal sides. The width of the flange portion 22 along a horizontal direction, i.e., a distance between the two vertical sides 25, is made larger than the outer diameter of the cylindrical part 21 as shown in FIG. 4(a). During the manufacturing process of the optical scanner 1, a mechanical hand is controlled to grasp the lens barrel 7 from upwardly. The mechanical hand easily grasps the vertical sides 25 of flange 22 that has a larger width than does the cylindrical part 21. The mechanical hand then inserts the lens barrel 7 into the bore 30a. The mechanical hand slidingly moves the lens barrel 7 in the bore 30a to accurately position the lens barrel 7. Fixedly grasped at the vertical sides 25, the lens barrel 7 will not rotate around its central axis in the mechanical hand. Accordingly, the slit 23 will not be angularly displaced from its desired orientation shown in FIG. 4(b). In other words, the angular position of the slit 23 can be automatically determined when the mechanical hand grasps the vertical sides 25. The vertical sides 25 therefore serve to prevent the lens barrel 7 from rotating while being handled by the mechanical hand.

According to the laser-lent support 6 and the lens barrel 7 with the above-described structure, the semiconductor laser 4 and the collimator lens 5 are precisely positioned so that the emission point 4a of the semiconductor laser 4 is substantially located on the optical axis 24 of the collimator lens 5 and so that the emission point 4a of the semiconductor laser 4 is located on the focal position of the collimator lens 5. With this arrangement, the laser beam emitted from the semiconductor laser 4 is properly converted by the collimator lens 5 into a beam of parallel rays. The parallel beam travels along the optical axis 24 and outputs from the slit 23.

Next, the cylindrical lens 8 will be described in greater detail. The lens 8 is located in confrontation with the slit 23 of the lens barrel 7 for receiving the laser beam emitted from the slit 23. The cylindrical lens 8 is constructed from a single rectangular parallelopiped-shaped plastic lens. The lens 8 converges the parallel laser beam only in a direction along the rotational axis of the polygon mirror 9. Accordingly, the laser beam is imaged on the mirror surface 11 as a long line image extending perpendicular to the rotational axis of the polygon mirror 9.

The polygonal mirror 9 will be described in greater detail below.

The polygonal mirror 9 has a regular hexagonal cylinder shape, and is formed through cutting and grinding an aluminum. The polygonal mirror 9 has six mirror-polished side surfaces 11 for reflecting the laser beam from the cylindrical lens 8. The surface smoothness of the side surfaces 11 is preferably as small as $\lambda/4$ where $\lambda$ is the wavelength of the laser beam. Such a highly smooth surfaces 11 will reflect the laser beam while not disrupting the beam shape. It is noted that the height of the polygonal mirror 9 along its rotational axis is preferably 3 to 4 mm.

The motor employed in this example is one type of well-known DC servomotor that has a DC brushless structure. The variation in its rotating speed is limited to approximately 0.01%. As the motor rotatingly drives the polygonal mirror 9, the polygonal mirror 9 successively deflects the incident laser beam and sweeps the laser beam in a horizontal direction along the bottom 2a of the housing 2.

The Fθ lens set 12 will be described in greater detail hereinafter.

The Fθ lens set 12 is constructed from a pair of substantially flat-shaped plastic lenses: a front lens 12a and a rear lens 12b. Each of the Fθ lenses is attached to the housing bottom 2a by a leaf spring not shown in the figure. For example, the Fθ lens set 12 may be fixed to the housing bottom 2a in the manner as described in Japanese Patent Application (Kokai) No. SHO-58-153907.

The Fθ lens set 12 has an Fθ characteristic so that the deflected laser beam converges into a spot on the surface of the photosensitive drum 3 and so that the spot moves or scans at a constant speed on the photosensitive drum 3. In general imaging lenses other than the Fθ lenses, when an angle of incidence θ of a light beam to the imaging lens changes, the imaging position r moves on the image surface as expressed by r=f·tanθ where f is the focal length of the imaging lens. It is noted, however, that when a laser beam is reflected by the polygonal mirror 9 rotating at a fixed angular speed as in the present embodiment, the angle of incidence θ changes linearly with time. Therefore, if a laser beam is switched on at a fixed time interval to form a line of spots on the photosensitive drum 3, the space between those spots widens at both ends compared to the central portion. This phenomenon will lower the image quality. To prevent this phenomenon, according to the present invention, the imaging lens set 12 is designed to have a Fθ characteristic wherein the imaging position r moves as expressed by r=f·θ. Accordingly, the beam spot on the photosensitive drum 3 will move on a scanning line at a constant speed.

The beamdetector 14 is constructed from a photoelectric conversion element such as a pin photodiode. The beam detector 14 detects the incident laser beam, and outputs a detection signal to the driving circuit board 15. The detection signal is for controlling the start timing at which the driving circuit board 15 starts supplying image data to the semiconductor laser 4. This timing control eliminates errors resulting from the angular variations between the reflecting surfaces 11 of the polygonal mirror 9. This timing control also reduces lack of synchronization between the respective scanning operations caused by irregular rotation of the motor. Accordingly, high-quality images can be obtained on the photosensitive medium 3. It becomes possible to widen the precision tolerance required for the polygonal mirror 9 and the motor.

The beam detector 14 is mounted in the sensor support 37. The sensor support 37 is integrally formed with the side wall 2b from resin. The driving circuit board 15 is also printed with a circuit for driving the beam detector 14. The beam detector 14 is connected with the driving circuit board 15 by soldering. Because the semiconductor laser 4 and the beam detector 14 are thus connected to the same printed circuit board 15, it is possible to shorten the signal paths, along which the detection signals are transferred from the detector 14 to the laser 4. This decreases the possibility that detection signals are disturbed by surrounding electrical noises. Additionally, because the driving circuits for both the laser 4 and the detector 14 are formed on the same circuit board 15, it is possible to reduce the number of printed circuit boards used in the optical scanner 1 and also reduce the number of harnesses connected between the driving circuit boards.

The knife-edge portion 18 is integrally formed with the housing side wall 2b from resin. The knife-edge portion 18 sharpens the edge of the laser beam that is falling incident on the beam detector 14. Because the beam detector 14 detects the laser beam with its edge being thus sharpened by the knife-edge 18, the detector 14 can detect, with high accuracy, a timing at which the laser beam falls incident on the detector 14. Because the knife-edge portion 18 is integrally formed with the housing 2, it is possible to reduce the number of parts constituting the optical scanner. In addition, it is possible to reduce the number of processes required for assembling the optical scanner 1.

According to the present embodiment, a widely-used fiberglass-containing polycarbonate can be used as the material of the housing 2 by selecting a collimator lens 5 of a proper chromatic aberration as described below.

As the temperature changes, the laser-lens support 6 expands or shrinks according to its linear expansion coefficient L [1/°C.]. This leads to change in the distance between the semiconductor laser 4 and the collimator lens 5. However, if the linear expansion coefficient L of the support 6 is an optimum linear expansion coefficient $L_{opt}$ that satisfies the following equation (1), the optical scanner 1 can still properly focus the laser beam on the surface of the photosensitive drum 3. The optical scanner 1 can therefore produce a high quality image on the photosensitive medium 3 even when the temperature changes.

$$C = D \times (E \times L_{opt} - A \times B) \qquad (1)$$

In the equation (1), A [m/nm] is an axial chromatic aberration of the collimator lens 5. That is, A indicates how the distance between the focal point of the lens 5 and the reference plane 27s, at which the lens 5 is located, changes according to change in a wavelength (color) of a light beam passing through the lens 5. B [nm/°C.] is a temperature coefficient of a wavelength of the laser beam emitted from the semiconductor laser 4. C [m/°C.] is a temperature coefficient of a back focus of the fθ lens set 12. In other words, C indicates how the distance between the focal point of the fθ lens set 12 (which is substantially located on the photosensitive drum 3) and a rear side surface of the rear lens 12b changes according to change in the temperature. D is a total axial magnification, in the deflecting direction, achieved by all the optical components 5, 8, 9, and 12 installed in the optical scanner 1. That is, the total axial magnification D is defined as an axial magnification totally obtained when the components 5, 8, 9, and 12 converge the laser beam in a direction parallel to the deflecting direction. E [m] is a distance along the optical axis 24 between the light emission point 4a of the laser 4 and the reference plane 27s on which the collimator lens 5 is positioned.

Next will be described a concrete example of material of the support 6 that provides the optimum linear expansion coefficient $L_{opt}$ satisfying the above equation (1).

Now assume that a GRIN lens with an axial chromatic aberration A of 1.3μ[m/nm] is employed as the collimator lens 5. An example of the GRIN lens is a lens named "Selfoc Lens" (Product name and Trademark of the Nippon Sheet Glass Company, Ltd.) manufactured by the same company. As the optical components in the optical scanner 1 other than the collimator lens 5, optical components employed in a laser printer named "HL-630" (Product Name,) manufactured by Brother Koryo Kabushiki Kaisha, are used. This laser printer is available in the market. The values B through E are therefore determined based on these optical components. In this case, the optimal linear expansion coefficient $L_{opt}$ is calculated as 39μ [1/°C.].

It is noted that a polycarbonate with 40% fiberglass content (such as that manufactured by GE Plastics Company, Ltd.) has the linear expansion coefficient L of about 39μ [1/°C.]. This resin is widely used in the industrial fields and therefore is a low-priced resin. Thus, by properly choosing a chromatic aberration of the collimator lens 5, it is possible to use a widely-used and low-priced resin as a medium 6 determining the distance between the semiconductor laser 4 and the collimator lens 5, i.e., the material of the housing 2.

By comparison, assume now that a well-known single glass-molded collimator lens (such as that manufactured by Matsushita Electric Industrial Company, Ltd.) is employed as the collimator lens 5. Such a single glass-molded collimator lens is widely used in this field. This collimator lens has an axial chromatic aberration A of as small as 0.4μ [m/nm]. If numerical values for the other parameters B–E are taken in the same way as described above, then the optimal linear expansion coefficient $L_{opt}$ becomes as small as 25μ [1/°C.]. Materials presenting this linear expansion coefficient include: metals such as aluminum, and some high-grade engineering plastics. These materials are highly expensive in comparison to the above-described resin.

It is noted that if materials with their linear expansion coefficients significantly deviated from the optimal linear expansion coefficient $L_{opt}$ are chosen for the support 6, however, the following problems will be occurred. The temperature in the housing 2 changes according to heat generated from the driving semiconductor laser 4. The focal point obtained by the optical scanner 1 will therefore be shifted from the surface of the photosensitive drum 3 along the optical axis. The beam spot diameter obtained on the photosensitive drum 3 will become large, thereby reducing the quality of the image output.

The present inventor performed an experiment, and determined a tolerance range of a displacement amount by which the focal point of the optical scanner 1 is displaced from the surface of the photosensitive drum 3 along the optical axis. The quality of an image obtained on the photosensitive drum 3 was acceptable when the displacement amount was within this tolerance range. The experimental results show that an acceptable image quality is obtained so long as the displacement occurred per 1° C. is in a range of −0.0004 meters and +0.0004 meters. It is therefore apparent that material with its linear expansion coefficient L satisfying the following inequality (2) should preferably be used as the support 6, i.e., as the housing 2 of the present embodiment.

$$-0.0004 < C - D \times (E \times L - A \times B) < 0.0004 \qquad (2)$$

The optical scanner 1 employed with the housing 2 made from material satisfying the above inequality (2) provides an acceptable quality image even under changes in temperature.

As described above, according to the optical scanner 1 of the present embodiment, the number of parts constituting the optical scanner 1 is greatly reduced. The number of processes required for producing the optical scanner 1 is therefore greatly reduced. First, the laser-lens support 6 is integrally formed with the housing 2. The semiconductor laser 4 and the lens barrel 7 may be simply inserted into the support 6. The knife-edge portion 18 is also integrally formed with the housing 2. Accordingly, manufacturing of the optical scanner 1 is simplified and a substantial increase in production efficiency is obtained. Further, the optical scanner 1 can be made with less parts than conventional devices, and therefore can be made cheaper.

Next, operation of the optical scanner 1 will be described below while referring to FIGS. 3 and 4(a).

The semiconductor laser 4 turns on and off according to image data supplied from the driving circuit board 15. The semiconductor laser 4 intermittently emits a laser beam. After the laser beam is made into a parallel beam by the collimator lens 5, the cross-sectional beam shape of the laser beam is controlled by the slit 23 provided in the downstream side end of the lens barrel 7. The laser beam is then converged by the cylindrical lens 8 only in a direction along the rotational axis of the polygon mirror 9 so that the laser beam strikes the surfaces 11 of the polygonal mirror 9 as a line image. Since the polygonal mirror 9 is rotated at a constant angular speed by the motor, the laser beam is deflected at a constant angular speed. The deflected laser beam is then converged by the Fθ lens set 12 to be focused on the surface of the photosensitive drum 3. In the Fθ lens, the laser beam is refracted so that the laser beam will scan the photosensitive drum 3 at a constant speed. Outside of the image scanning region, the laser beam is reflected by the mirror 13, and guided to the beam detector 14. The beam detector 14 detects when the thus sweeping laser beam falls incident on the detector 14, and outputs a detection signal.

After the photosensitive drum 3 is scanned by the laser beam according to the image data, a corresponding image is formed on the photosensitive drum 3. The image is then developed through well-known image processes such as electrophotographic processes, and transferred and fixed to a transfer material and outputted as a hard copy.

While the invention has been described in detail with reference to the specific embodiment thereof, it would be apparent to those skilled in the art that various changes and modifications may be made therein without departing from the spirit of the invention, the scope of which is defined by the attached claims.

The laser-driving area 100 of the optical scanner 1 can be modified as follows.

Figure 5:
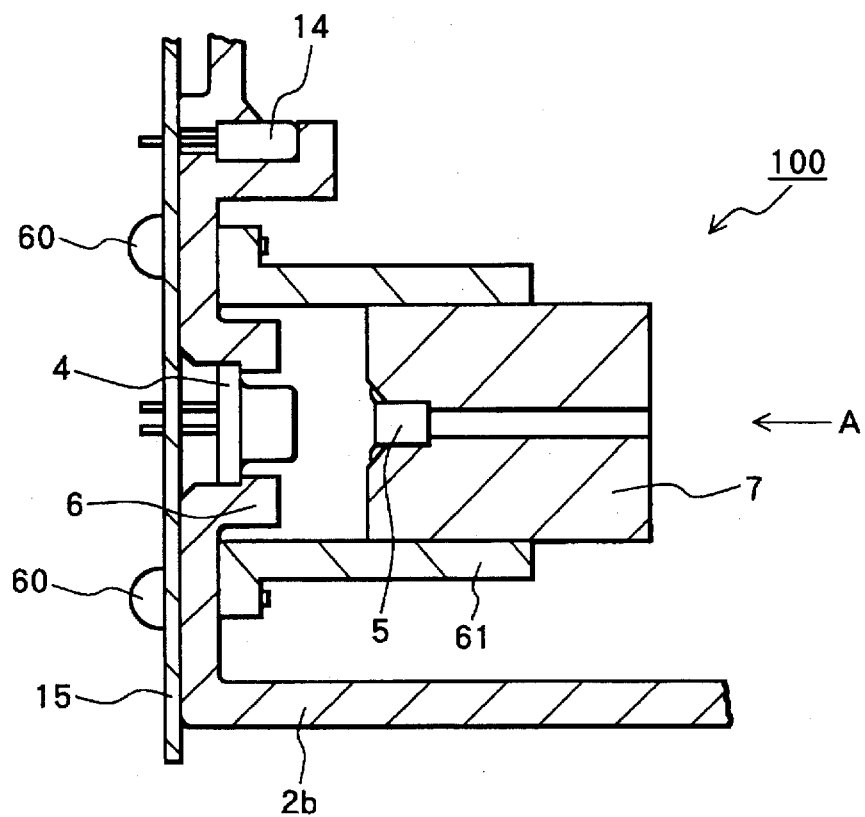
FIG. 5(a) is an enlarged plan view of a laser-driving area 100 in an optical scanner of a modification of the present invention which partially shows a cross-section.
FIG. 5(b) is a side view of a lens barrel 7 as viewed from A in FIG. 5(a)
Figure 5:
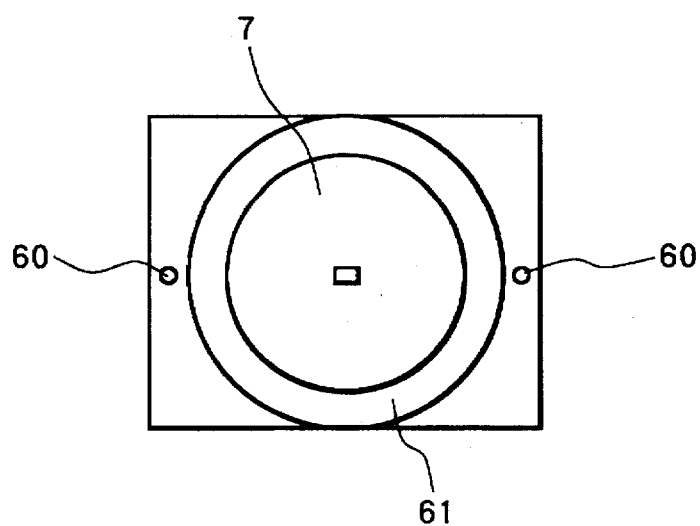

FIGS. 5(a) and 5(b) show a modification of the laser-driving area 100. In this modification, the laser-lens support 6 is used for supporting only the semiconductor laser 4. A separate lens barrel holder 61 is employed for supporting the lens barrel 7. With this structure, it becomes possible to adjust the position of the collimator lens 5 in directions normal to the optical axis 24. The center of the collimator lens 5 can therefore be precisely located in confrontation with the emission point 4a of the semiconductor laser 4.

It therefore becomes possible to precisely control the laser beam emission direction and beam position on the photosensitive drum 3. That is, when the center of the collimator lens 5 is slightly shifted from the emission point 4a, the laser beam enters the center of the lens 5 at a certain incident angle. In such a case, the laser beam is imaged on a position on the photosensitive drum 3 that is shifted from a desired position, onto which the laser beam will be imaged when the lens 5 precisely confronts the emission point 4a. The image position shift amount is defined as Fθ where F is the focal length of the imaging lens system and θ is the incident angle. According to the present modification, however, the position of the lens 5 can be precisely adjusted relative to the semiconductor laser 4. Accordingly, it becomes possible to adjust the incident angle of the laser beam with regard to the lens 5 and therefore becomes possible to adjust the position of the beam spot on the photosensitive medium 3.

It is noted that in this modification, the lens barrel holder 61 and the driving circuit board 15 are secured together to the housing side wall 2b by the same screws 60. Accordingly, the lens-driving area 100 can be easily produced.

Further, as shown in FIGS. 6(a) and 6(b), a lens mount 80 can be integrally formed with the housing bottom 2a. The lens mount 80 is formed with a V-shaped groove 62. The collimator lens 5 is placed directly on the V-shaped groove 62. The cylindrically-shaped collimator lens 5 is placed on the groove 62 with its central axis extending along the groove 62. The lens 5 is easily slidable along the V-shaped groove 62 in the direction of its central axis, i.e., in the optical axis direction 24. Thus, adjustment of the distance between the laser 4 and the lens 5 can be easily attained. After the lens 5 is precisely positioned on the groove 62, the lens 5 may be fixed by an adhesive 28 to the groove 62. According to this modification, the lens barrel 7 can be omitted, and a further reduction of parts can be attained.

Still further, as shown in FIGS. 7(a) and 7(b), the lens mount 80 may be further formed with a U-shaped groove 72. The U-shaped groove 72 is connected with the V-shaped groove 62 via a stepped portion 63. With this structure, the collimator lens 5 is positioned on the groove 62 in abutment contact with the stepped portion 63. Thus, it becomes possible to easily control the position of the lens 5. After the lens 5 is placed on the groove 62 at the stepped portion 63, the lens 5 may be attached to the groove 62 with adhesive 28. By providing the stepped portion 63 in this way, positioning of the collimator lens 5 is simplified.

It is noted that the U-shaped groove 72 is formed with a recess 73 at a certain position. A board 65 is mounted above the recess 73 to form a slit 64. The board 65 is fixedly secured to the U-shaped groove 72 via pins 66. The slit 64 serves as the slit 23 of FIG. 4(a).

In this modification, however, as will be explained later in reference to FIGS. 9(a) and 9(b), it is necessary to adjust the relative position between the laser 4 and the lens 5 through moving or shifting the laser 4 in the optical axis direction 24.

Figure 6:
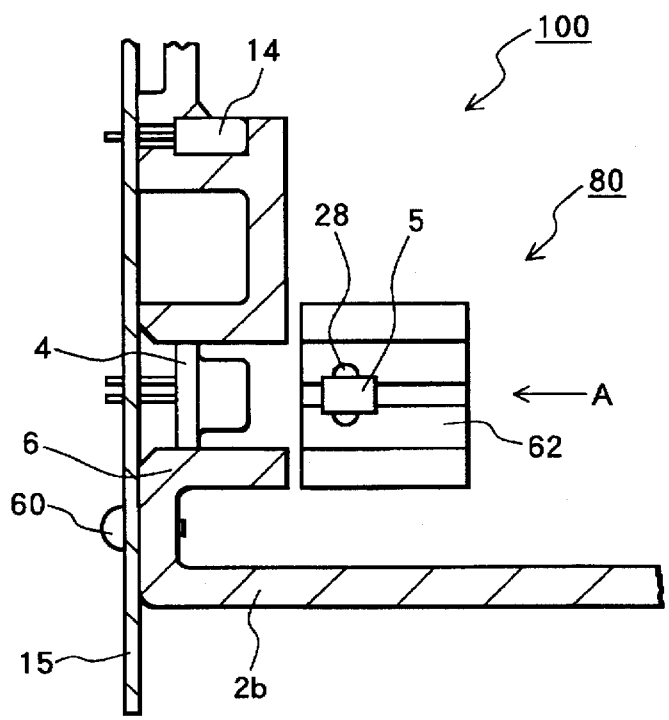
FIG. 6(a) is an enlarged plan view of a laser-driving area 100 in an optical scanner of another modification of the present invention which partially shows a cross-section.
FIG. 6(b) is a side view of a lens mount 80 as viewed from A in FIG. 6(a)
Figure 6:
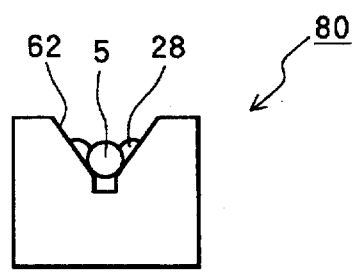
Figure 7:
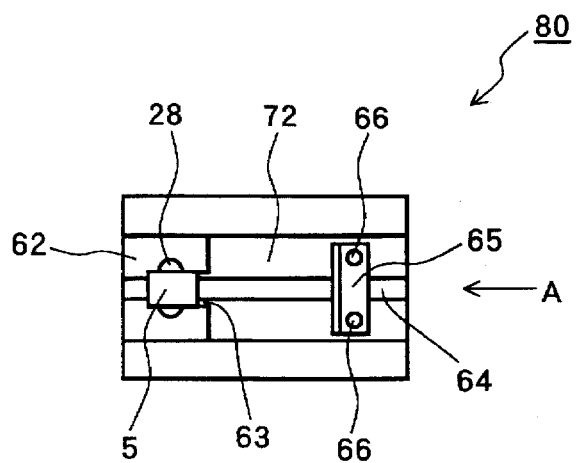
FIG. 7(a) is an enlarged plan view of a modification of the lens mount 80 of FIG. 6(a)
FIG. 7(b) is a side view of the lens mount 80 as viewed from A in FIG. 7(a)
Figure 7:
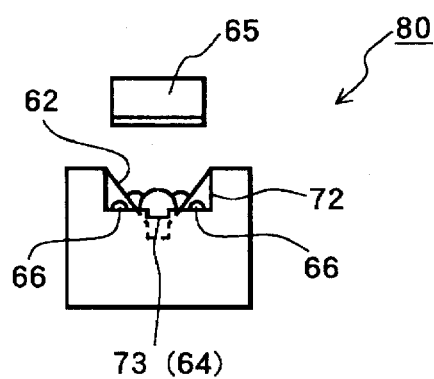

In the above-described modifications of FIGS. 6 and 7, the collimator lens 5 is placed directly on the V-shaped groove 62. However, it is also possible to first attach the collimator lens 5 to the lens barrel 7 as similarly in the embodiment of FIGS. 3 and 4, and then place the lens barrel 7 on the V-shaped groove 62. This method prevents the collimator lens 5 from being formed by scratches or attached with dust particles, which will possibly lower the image quality on the photosensitive drum 3.

Further, as shown in FIGS. 8(a) and 8(b), the semiconductor laser 4 connected to the driving circuit board 15 may be first force-fitted into a laser holder 70. Thus, a laser source unit is produced from the laser 4, the driving circuit board 15 and the laser holder 70. The laser unit is then secured to the housing 2 by screws 60. Also in this case, it is possible to easily adjust the relative position between the emission point 4a of the semiconductor laser 4 and the collimator lens 5 in directions normal to the optical axis direction 24. It is therefore possible to highly precisely control the laser emission direction and the beam position on the photosensitive drum 3.

Next, as shown in FIGS. 9(a) and 9(b), the support 6 may be formed with an additional bore 68. The bore 68 is connected with the bore 30a via a smaller bore 90. A stepped portion 68a is therefore formed between the bores 68 and 90. The collimator lens 5 is held in the bore 68 in abutment contact with the stepped portion 68a. The collimator lens 5 is secured by adhesive to the bore 68.

The semiconductor laser 4 is running fitted into a the bore 30a of the support 6. The position of the laser 4 is adjusted relative to the lens 5 in both the optical axis direction 24 and the directions normal to the optical axis direction 24. Then, the laser 4 is fixed with an adhesive 67 in the bore 30a. It is preferable to use a UV adhesive as the adhesive 67. The UV adhesive will not whiten a glass window provided on the emission point 4a of the semiconductor laser 4. The UV adhesive will instantaneously set after when the laser 4 is precisely positioned in the bore 30a.

A slit holder 69 is provided on the housing bottom 2a. The slit holder 69 is located on the optical axis 24 of the collimator lens 5. The slit holder 69 is formed with a recess 69a for receiving a slit plate (not shown in the figure). The slit plate is formed with a slit for shaping the laser beam from the collimator lens 5. The slit plate is simply inserted into the recess 69a so that the slit is located exactly on the optical axis 24 of the collimator lens 5.

Figure 4:
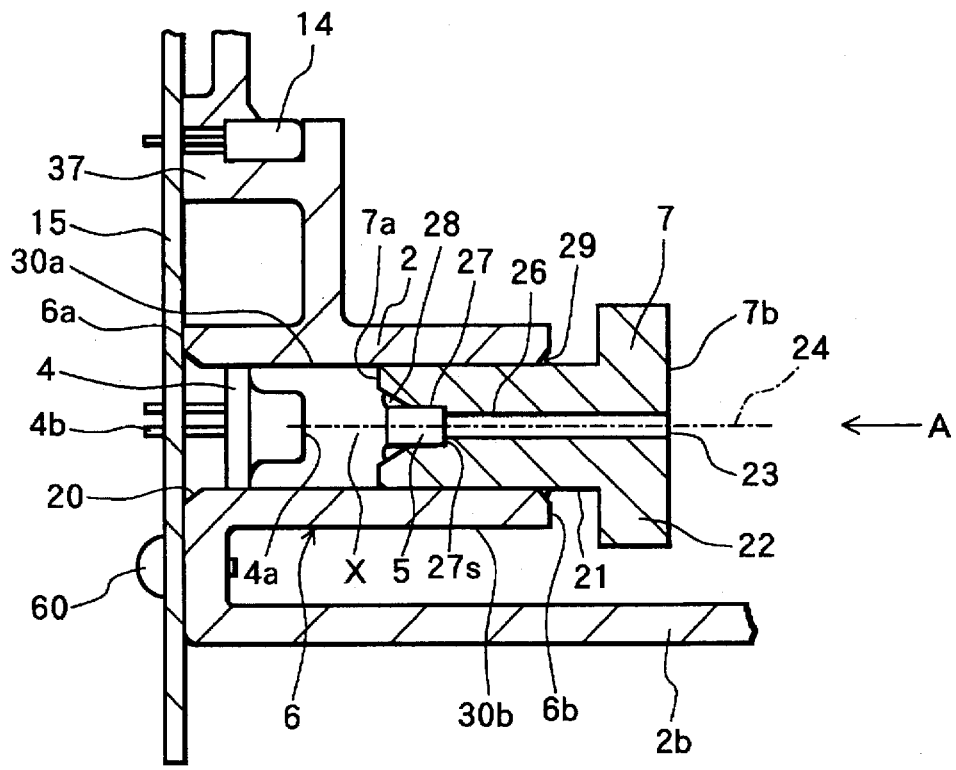
FIG. 4(a) is an enlarged plan view of a laser-driving area 100 of the optical scanner of FIG. 3 which partially shows a cross-section.
FIG. 4(b) is a side view of a lens barrel 7 as viewed from A in FIG. 4(a)
Figure 4:
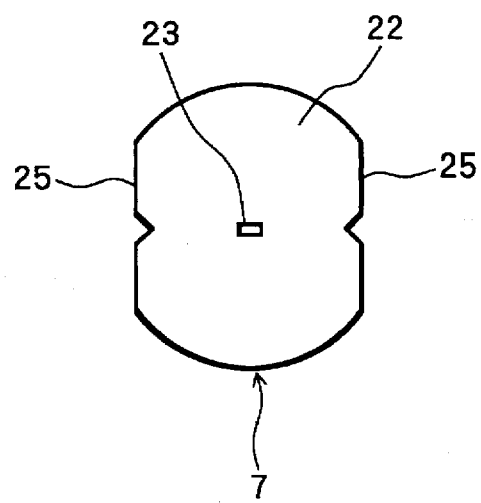

It is noted that the semiconductor laser 4 may be running fitted into the bore 30a also in the embodiment of FIGS. 3 and 4 similarly as shown in FIG. 9(a).

The above-described present embodiment is directed to a so-called write-type optical scanner in which a laser beam exposes a photosensitive drum 3 according to image data to thereby form a corresponding image. However, it is also possible to modify the embodiment to a read-type optical scanner for scanning a document to read an image from the document and produce corresponding image data.

As described above, in the optical scanner of the present invention, the laser source emits a laser beam. The optical axis determining system determines the optical axis along which the laser beam travels. The deflection unit radially deflects the laser beam which has traveled along the optical axis. The optical imaging system converges the deflected laser beam on the surface of the medium to be scanned. The housing incorporates the support portion integrally formed with the housing body to support at least the laser source and the optical axis determining system. Further, the housing is formed from resin to enable installation of the deflection unit and the optical imaging system. Thus, it is possible to reduce the number of parts making up the optical scanner and simplify the optical scanner configuration. Further, the laser source and the optical axis determining system are directly supported by the housing. Therefore, alignment work of the optical axis and the focal position is able to be simplified. It is possible to improve production efficiency of the optical scanner through reducing the number of manufacturing manhours.

I claim:

1. An optical scanning device for optically scanning a medium, the optical scanning device comprising:
    a light source for emitting a light beam;
    optical axis determination means for determining an optical axis, along which the light beam emitted from the light source travels;
    deflection means for deflecting the light beam which has travelled along the optical axis;
    optical imaging means for receiving the deflected light beam and for imaging the light beam into a beam spot on a medium to be scanned;
    a housing for housing the deflection means and the optical imaging means; and
    a support portion for supporting at least one of the light source and the optical axis determination means, the support portion being integrally formed with the housing.

2. An optical scanning device of claim 1, further comprising holding means for holding the optical axis determination means, the support portion supporting at least one of the light source and the optical axis determination means.

3. An optical scanning device of claim 2, wherein the support portion has a cylindrical shape and is formed with a cylindrical bore, an outer peripheral side surface of the at least one of the light source and the holding means being supported in the cylindrical bore.

4. An optical scanning device of claim 3, wherein the at least one of the light source and the holding means is attached via an adhesive to the inner surface of the cylindrical bore.

5. An optical scanning device of claim 3, wherein the at least one of the light source and the holding means is force-fitted in the cylindrical bore.

6. An optical scanning device of claim 2, wherein the support portion has a V-shaped groove for supporting thereon the at least one of the holding means and the optical axis determination means.

7. An optical scanning device of claim 6, wherein the support portion supports the optical axis determination means on the V-shaped groove, the optical axis determination means having a cylindrical shape, the optical axis determination means being placed on the V-shaped groove with its axis being parallel to a direction in which the V-shaped groove extends.

8. An optical scanning device of claim 6, wherein the support portion further has a stopper portion or the V-shaped groove for determining the position of the at least one of the holding means and the optical axis determination means.

9. An optical scanning device of claim 1, wherein the support portion has a cylindrical shape, the optical axis determination means being supported in the support portion in abutment contact therewith.

10. An optical scanning device of claim 9, wherein the support portion is formed with first and second cylindrical bores, the first bore having a larger diameter than the second bore, the first and second bores being connected with each other via a stepped region, the optical axis determination means being supported in the first bore in abutment contact with the stepped region.

11. An optical scanning device of claim 10, wherein the optical axis determination means is attached via an adhesive to the surface of the bore.

12. An optical scanning device of claim 10, wherein the optical axis determination means is force-fitted to the bore.

13. An optical scanning device of claim 1, further comprising:
    a driving board for driving the light source, the driving board being connected with the housing; and
    a sensor for detecting the light beam deflected by the deflection means, the sensor being located on the driving board.

14. An optical scanning device of claim 1, wherein the light source includes a semiconductor laser.

15. An optical scanning device of claim 1, wherein the optical axis determination means includes a collimator lens.

16. An optical scanning device of claim 15, wherein the collimator lens includes a gradient index lens.

17. An optical scanning device for optically scanning a medium, the optical scanning device comprising:
    a light source for emitting a light beam;
    optical axis determination means for determining an optical axis, along which the light beam emitted from the light source travels;
    deflection means for deflecting the light beam which has travelled along the optical axis;
    optical imaging means for receiving the deflected light beam and for imaging the light beam into a beam spot on a medium to be scanned;
    a housing for housing the deflection means and the optical imaging means; and a support portion for supporting at least one of the light source and the optical axis determination means, the support portion being integrally formed with the housing, the support portion having a linear expansion coefficient L, the linear expansion coefficient L [1/°C.] satisfying the following inequality:

$$-0.0004 < C - D \times (E \times L - A \times B) < 0.0004$$

where A [m/nm] is an axial chromatic aberration of the optical axis determination means; B [nm/°C.] is a temperature coefficient of a wavelength of the light beam; C [m/°C.] is a temperature coefficient of a back focus of the optical imaging means; D is a total axial magnification in the deflecting direction obtained by the optical axis determination means, the deflection means, and the optical imaging means; and E [m] is a distance along the optical axis direction between a light emission point of the light source and a reference plane on which the optical axis determination means is mounted.

18. An optical scanning device of claim 17, further comprising holding means for holding the optical axis determination means, the support portion supporting at least one of the light source and the optical axis determination means.

19. An optical scanning device of claim 18, wherein the support portion has a cylindrical shape and is formed with a cylindrical bore, an outer peripheral side surface of the at least one of the light source and the holding means being supported in the cylindrical bore.

20. An optical scanning device of claim 17, wherein the support portion has a cylindrical shape and is formed with first and second cylindrical bores, the first bore having a larger diameter than the second bore, the first and second bores being connected with each other via a stepped region, the optical axis determination means being supported in the first bore in abutment contact with the stepped region.

* * * * *